(No Model.)

I. G. PLATT.
RIVET.

No. 446,466. Patented Feb. 17, 1891.

WITNESSES:
Gustave Dieterich.
William Goebel.

INVENTOR
Irving G. Platt,
BY George Cook.
ATTORNEY.

UNITED STATES PATENT OFFICE.

IRVING G. PLATT, OF WATERBURY, CONNECTICUT.

RIVET.

SPECIFICATION forming part of Letters Patent No. 446,466, dated February 17, 1891.

Application filed October 30, 1890. Serial No. 369,796. (No model.)

*To all whom it may concern:*

Be it known that I, IRVING G. PLATT, a citizen of the United States, and a resident of Waterbury, in the county of New Haven and State of Connecticut, have invented certain new and useful Improvements in Rivets, of which the following is a specification.

My invention relates to an improved tack or rivet, and more particularly to that kind or class thereof used in connection with a metal washer, button, disk, or other device, the object of the same being to so construct an article of this kind that a certain and definite amount of stock shall always be provided at one end of the rivet and beyond said metal disk or washer for forming the head or upset upon such end of the rivet; or, in other words, to so construct the rivet that the head or upset on the end thereof will always be of one certain size, thereby allowing of the use of one certain-sized tool for upsetting such end, and this without reference to the thickness of the metal, fabric, or other material through which the rivet is passed.

With these ends in view my invention consists of a metal rivet made either solid or hollow and tapering to be used in connection with a metal washer, disk, button, or other device provided with a hole or opening for the entrance of such rivet and of a diameter larger than that of the smaller end of the rivet and smaller than the lower or flanged end of the rivet.

My invention further consists of a metal rivet made either hollow or solid and flanged at one end, the shank thereof being made more or less tapering and provided with a shoulder or seat for the metal washer, button, disk, or other device in connection with which the rivet may be used.

My invention further consists in certain novel features of construction hereinafter fully described, and specifically pointed out in the claims.

Figure 1:
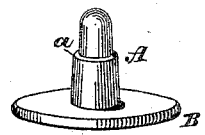
Figure 2:
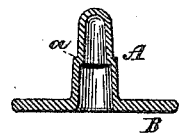
Figure 3:
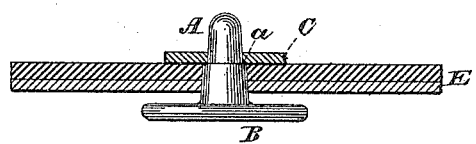
Figure 4:
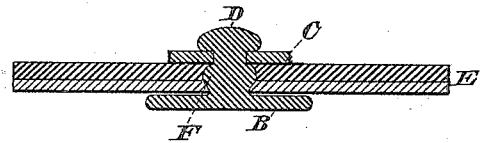
Figure 5:
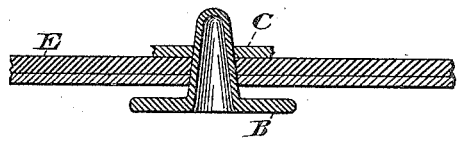

In the accompanying drawings, Figure 1 is a view in elevation of a rivet constructed in accordance with my invention. Fig. 2 is a view in section of a hollow rivet made in accordance with my invention. Fig. 3 is a view in elevation of my improved form of rivet, showing a washer, button, or disk placed thereon prior to the upsetting of the rivet. Fig. 4 is a view in section of the solid rivet after being upset. Fig. 5 is a modified form of hollow rivet having a button, disk, or other article applied thereto prior to the upsetting of the end.

Heretofore a great disadvantage has been encountered in using rivets as ordinarily constructed, in that the size of the head or upset has invariably depended upon the thickness or amount of material through which the rivet or tack is forced, thus requiring the use of different-sized tools for forming such upset or head. To overcome this I construct a rivet with the shank A, provided at one end with the flange B, the shank A being made hollow or solid, as desired, and in accordance with the material through which the rivet is to be passed, as in some cases for heavy work, it might be desired to have the rivet made solid, and in light work it might be more desirable to have the rivet strong, but at the same time light, in which case I prefer to use it in its hollow form. This shank A, it will be seen, is more or less tapered both in the hollow and solid form, the piercing end being smaller in diameter than the flanged end. In order to secure a certain amount of metal above the washer, button-body, or disk C, I form on the shank a shoulder *a*, which forms a seating for said disk or plate, the metal or stock contained in the shank above said disk C being swaged or upset to form the head D. It is obvious, of course, that this shoulder *a* may be formed at any point upon the tapering shank, its location depending upon the size of the head or upset or the amount of stock which shall be utilized in forming the same. This shoulder, it will be understood, allows the shank of the rivet to pass through the opening in the disk, plate, button-body, or washer to a certain distance—that is, until the latter strikes the shoulder—and this without reference to the thickness of the material E, through which the rivet is passed, it being understood, of course, that the length of the shank between the shoulder *a* and the flange B shall be greater or at least equal to the thickness of the thickest material in connection with which it will be desired to use the rivet. This form of rivet, it will be seen, may be used with plates, buttons, washers, disks, or other articles secured on or by said rivet having different-sized openings; but where the article or articles to be secured on or by said rivet have approximately the same-sized opening therein for the entrance of the rivet, I may, if preferred, omit the shoulder $a$ and construct the rivet with the hollow shoulder slightly more tapering, such taper depending to a great extent upon the size of the opening in the article to be secured on or by said rivet and the amount of metal which it is desired shall be utilized, the slighter the taper and the less amount of metal to be utilized the greater the taper, and this for the purpose of allowing the shank to pass through the opening in the article to a certain distance, as shown in Fig. 5, that space between the article C and the flange B being filled or partially filled by the material or stock E.

In practice the rivet is first forced through the material E, and the article C then placed in position upon the shank, or, where found convenient, the rivet may be passed through the material and through the opening in the article C at one and the same time. By means of a suitable tool (not shown) the rivet is then swaged, forming a head or upset D of a certain size. A second shoulder F is also formed simultaneously, securely clamping the cloth between the article C and flange B, the size thereof depending upon the thickness and character of the material E.

My invention is exceedingly simple, and by reason of its peculiar construction and shape a certain-sized tool may always be employed for forming the upset or head on the end thereof, which latter, as before stated, will always contain a definite and certain amount of stock, even though the rivet be passed through materials of different thickness.

Having fully described my invention, what I claim as new, and desire to secure by Letters Patent, is—

1. A rivet constructed with a tapering shank, in combination with a disk or other article fitting on said rivet and having an opening therein of larger diameter than that of the piercing end of the rivet and smaller than that of the flanged end of the rivet.

2. A rivet constructed with a shank and having a washer or other article secured thereon, one end of said shank being formed into a head or upset containing a certain and definite amount of stock, said shank having a second shoulder formed thereon and of a size dependent upon the thickness of the material through which said rivet is passed.

3. A rivet constructed with a shank having a shoulder formed thereon, a head or upset formed on the end of said shank containing a certain and definite amount of material, and a lower head or shoulder of a size dependent upon the thickness of the material through which said rivet is passed.

4. A rivet constructed with a tapering shank A, having a flange B formed on one end thereof, and a shoulder $a$, as and for the purpose set forth.

Signed at Waterbury, in the county of New Haven and State of Connecticut, this 13th day of October, A. D. 1890.

IRVING G. PLATT.

Witnesses:
L. A. PLATT,
JAY H. HART.